Aug. 9, 1960 C. N. JOHNSEN ET AL 2,948,498

ROLL-OUT MECHANISM

Filed Oct. 4, 1956 4 Sheets-Sheet 1

INVENTOR.
CLIFFORD N. JOHNSEN
EMIL T. NEUBAUER

BY Holmes & Andusen

ATTORNEYS

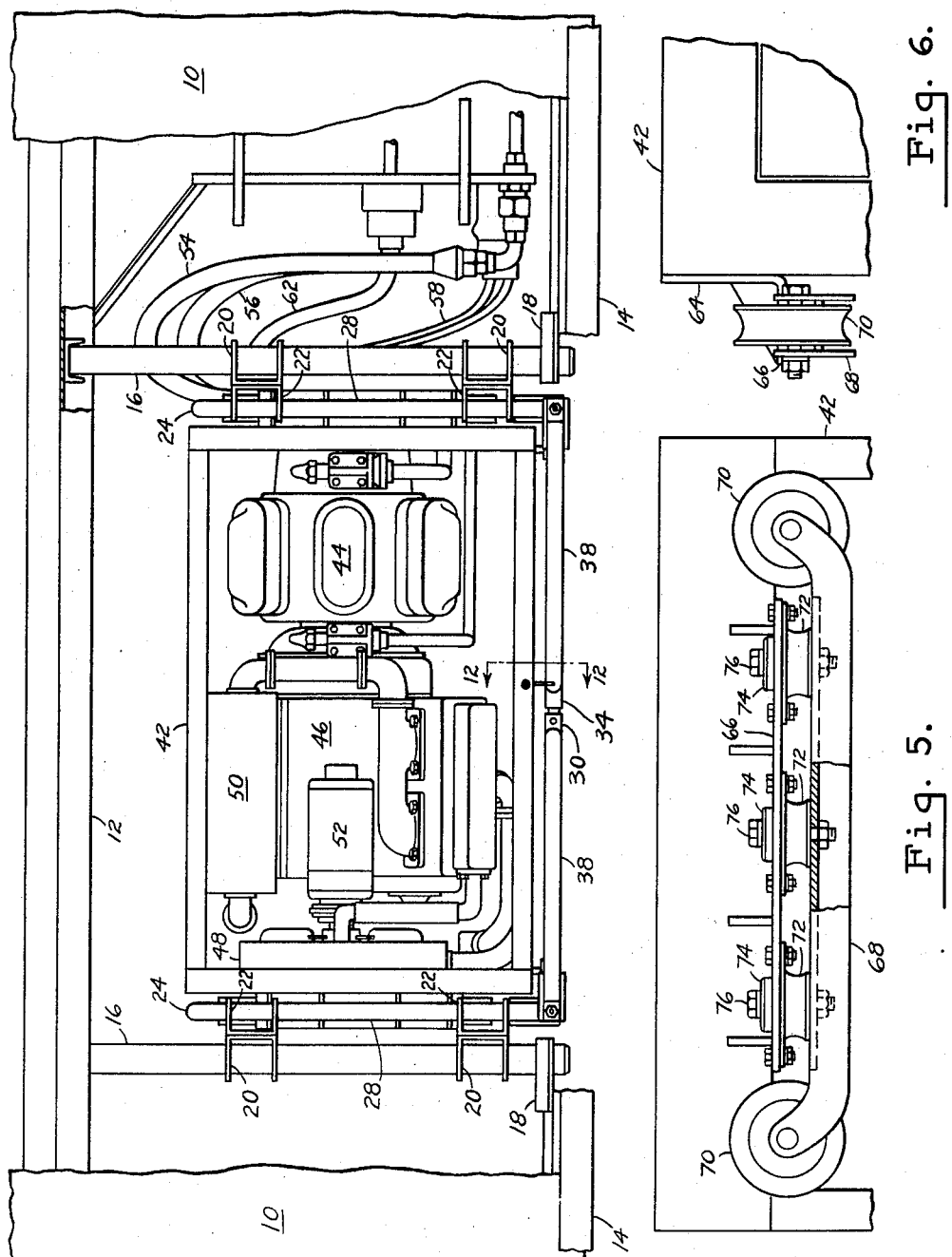

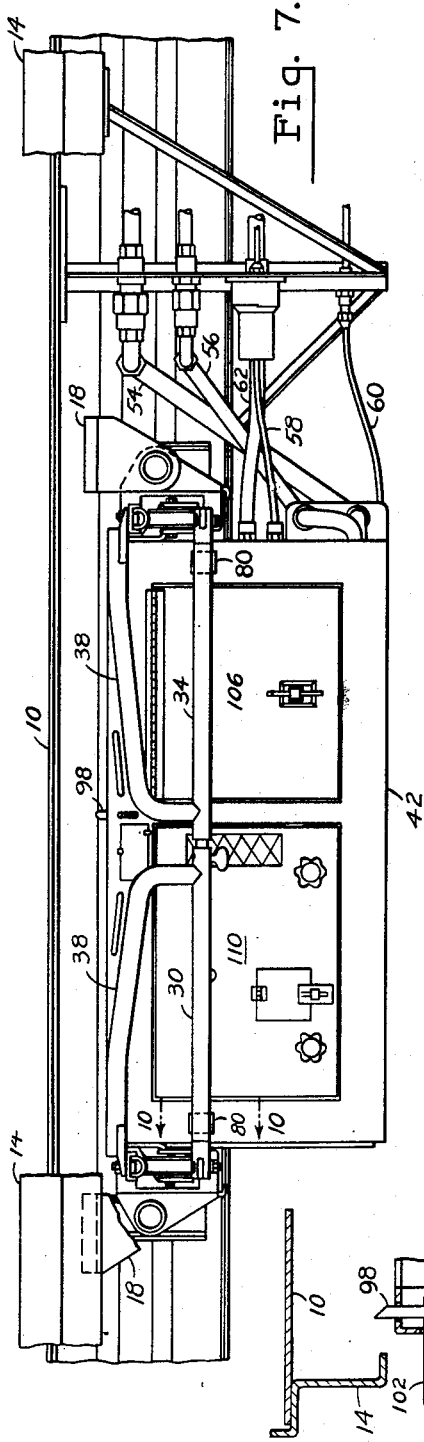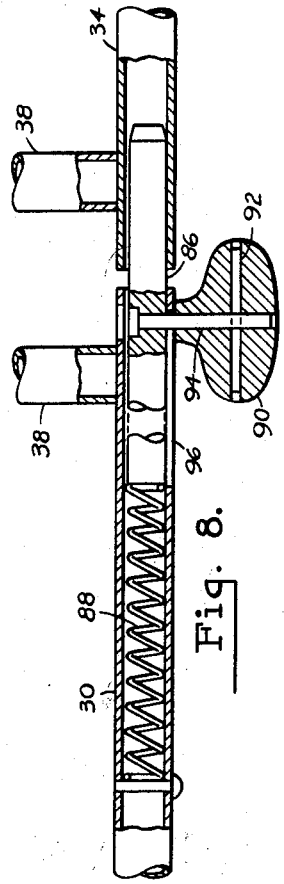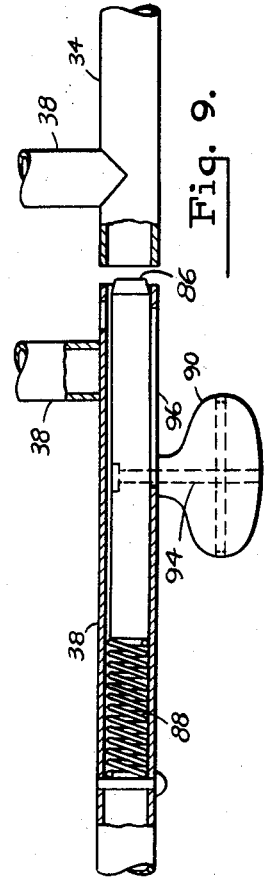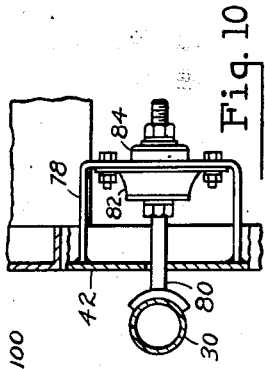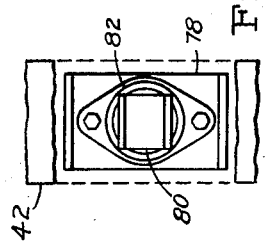

Aug. 9, 1960  C. N. JOHNSEN ET AL  2,948,498
ROLL-OUT MECHANISM

Filed Oct. 4, 1956  4 Sheets-Sheet 4

INVENTOR.
CLIFFORD N. JOHNSEN
EMIL T. NEUBAUER
BY
*Holmes & Andersen*
ATTORNEYS

United States Patent Office 2,948,498
Patented Aug. 9, 1960

2,948,498
ROLL-OUT MECHANISM

Clifford N. Johnsen and Emil T. Neubauer, La Crosse, Wis., assignors to The Trane Company, La Crosse, Wis., a corporation of Wisconsin Filed Oct. 4, 1956, Ser. No. 613,951

5 Claims. (Cl. 248—17)

This invention relates to refrigerator units and more particularly to units which must be moved from their normal positions to a more accessible position for inspection and maintenance operations. The invention is concerned with improved means for mounting underneath vehicles such equipment as refrigeration or air conditioning units whereby such units can be easily moved out from their normal positions to exterior positions for servicing and vice versa.

It is an object of this invention to provide improved means for supporting a unit of the aforementioned type for movement between its normal position and a more accessible position.

It is an additional object of this invention to provide a unit with rollers and to provide a track under a vehicle for supporting the unit on said rollers and to further provide a track extending from underneath the vehicle whereby the unit may be rolled from a position underneath the vehicle.

It is another object of the invention to provide vibration isolating means between the unit and its supporting tracks to support the unit against movement in two planes.

It is another object of the invention to mount extension tracks for pivotal movement from a position in which they form a continuation of the fixed tracks to a position underneath the vehicle in which position they hold the unit in place beneath the vehicle.

Other objects and advantages of this invention will become apparent as the specification proceeds to describe the invention with reference to the accompanying drawings in which:

Fig. 4 is a top plan view of the apparatus with the unit in operating position;

Fig. 5 is a side elevational view of a portion of the unit;

Fig. 6 is a front elevational view of a portion of the unit;

Fig. 7 is a front elevational view of the apparatus in operating position;

Fig. 8 is an enlarged plan view partly in section showing the means for latching the extension arms in closed position;

Fig. 9 is an enlarged elevational view partly in section of the mechanism of Fig. 8;

Fig. 10 is an enlarged sectional view taken on the line 10—10 of Fig. 7;

Fig. 11 is an enlarged end view of the mechanism of Fig. 10;

Fig. 12 is a partial sectional view of the bolt for holding the unit in operating position;

Figure 1:
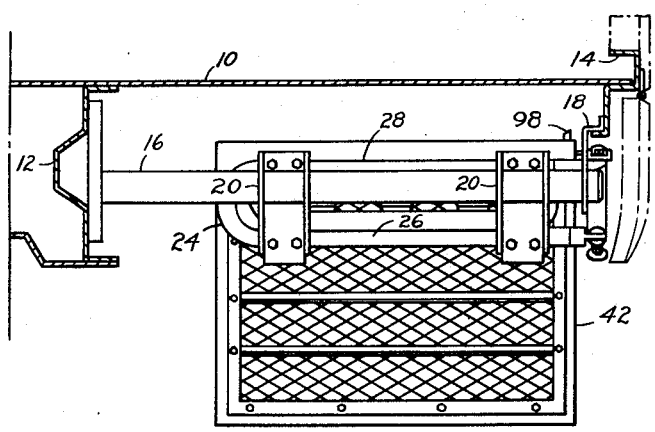
Fig. 1 is a side elevational view of the apparatus with the unit in operating position underneath the vehicle.
Figure 2:
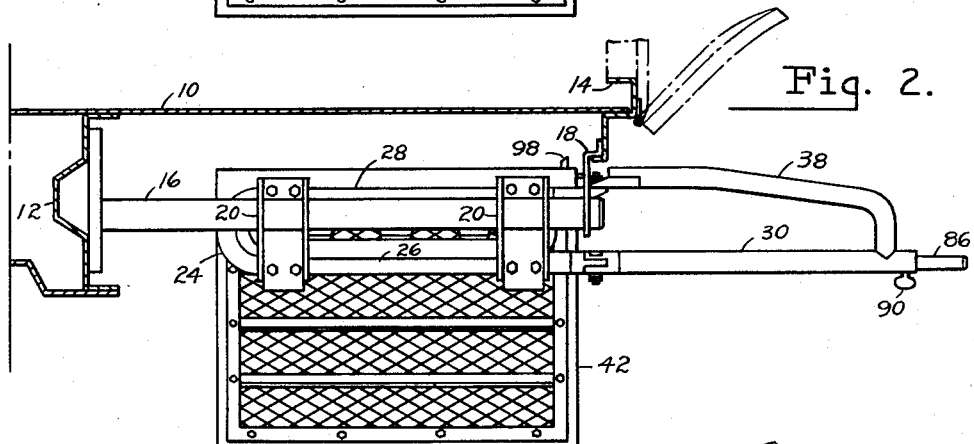
Fig. 2 is a side elevational view of apparatus with the extension arms in extended position but with the unit in place underneath the vehicle.
Figure 3:
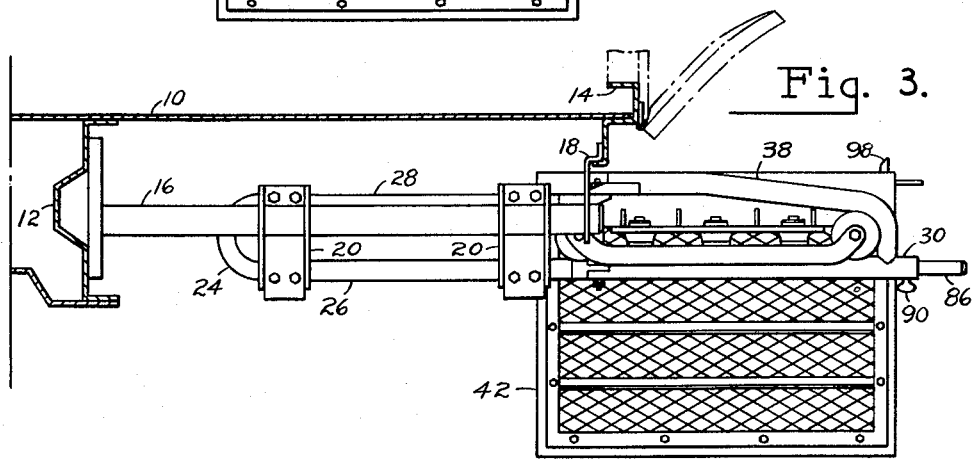
Fig. 3 is a side elevational view of the apparatus with the unit in extended position.
Figure 13:
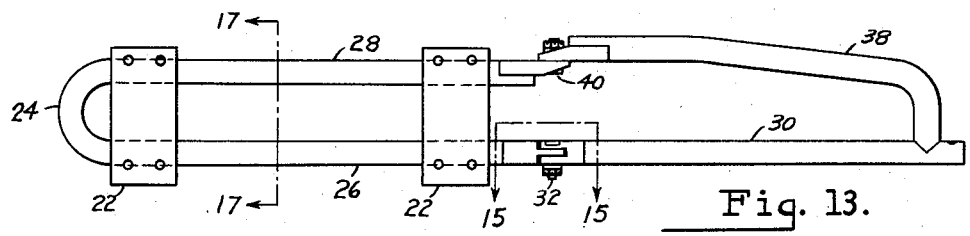
Fig. 13 is a side elevational view of the track in extended position.
Figure 14:
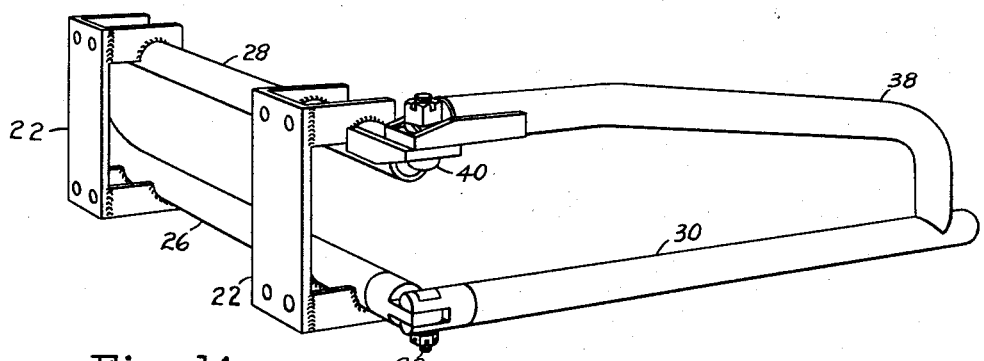
Fig. 14 is a perspective view of the track in retracted position.
Figure 15:
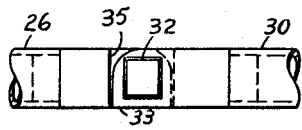
Fig. 15 is a plan view taken on the line 15—15 of Fig. 13.
Figure 16:
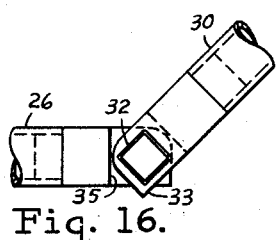
Fig. 16 is a view similar to Fig. 15 but with the extension track in partly retracted position.
Figure 17:
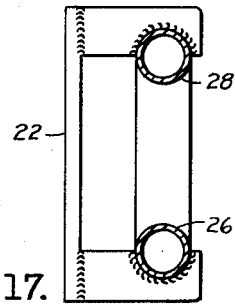
Fig. 17 is a sectional view taken on line 17—17 of Fig. 13.
Figure 18:
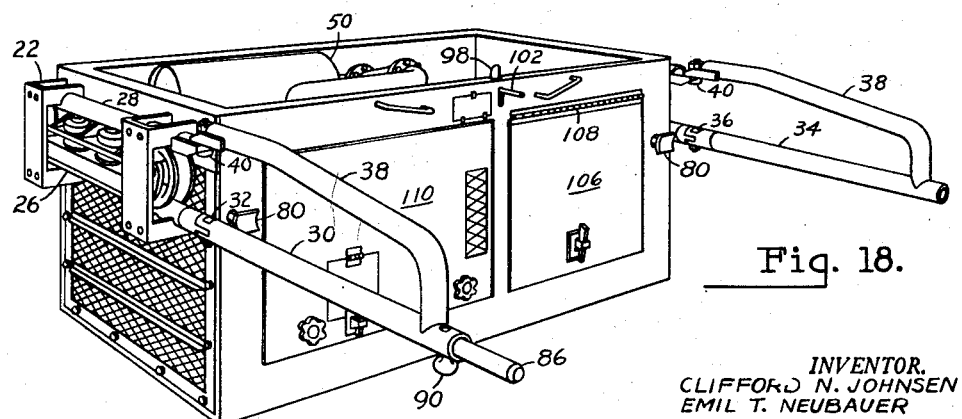
Fig. 18 is a perspective view of the unit and the tracks with the extension tracks in extended position.

Referring now to the drawings, numeral 10 designates the floor of the vehicle. Numerals 12 and 14 designate the center sill and side sill respectively of the vehicle. A pair of spaced parallel support bars 16 are secured at their inner ends to the center sill 12. The outer ends of the support bars 16 are supported by brackets 18 which are secured to the support bars 16 and to the side sill 14. A pair of brackets 20 are mounted on each bar 16. A bracket 22 is bolted to each of brackets 20. A U-shaped fixed track 24 having a lower rail 26 and an upper rail 28 is secured to each pair of brackets 22 as by welding.

A left hand extension track 30 is pivotally secured to the left hand lower fixed track 26 by a bolt 32. A right hand extension track 34 is pivotally secured to the right hand lower fixed track 26 by a bolt 36.

The outer end of the extension track 30 has an abutment 33 which engages a shoulder 35 on the fixed track 26 to prevent the extension track 30 from swinging beyond alignment with the fixed track 26. The extension track 34 has a similar abutment for the same function.

Each of the extension tracks 30 and 34 have support bars 38 welded at their outer ends to the outer ends of the extension tracks 30 and 34. Support bars 38 are pivotally secured to the upper fixed tracks 28 by bolts 40.

The unit has a frame 42 on which is supported a compressor 44 and an engine 46 connected to drive the compressor 44. The engine 46 has a radiator 48, a muffler 50, and a generator 52 all mounted within the frame 42. In order to permit movement of the unit between its operating position and its inspection position there is a plurality of flexible lines serving the compressor 44 and the engine 46. The compressor 44 has a flexible suction line 54 and a flexible discharge line 56. The engine has flexible battery cables 58 and flexible fuel lines 60. A flexible control line 62 extends from the unit to the vehicle.

The unit frame 42 has at each end a bracket 64 secured thereto. Bracket 64 has an outwardly extending flange 66. Carriages 68 have at each end grooved wheels 70 which are supported on rails 26, 30 and 34. Resilient rubber isolators 72 are supported on carriage 68, and flange 66 is supported on the isolators 72. Resilient rubber isolators 74 are mounted above the flange 66. Bolts 76 extend through isolators 74, flange 66, isolators 72 and carriage 68 to hold the parts together.

Brackets 78 are secured to the front side of the unit frame 42 adjacent each end. An abutment member 80 is resiliently mounted on the bracket 78 by means of resilient rubber isolators 82 and 84. When the tracks 30 and 34 are moved to closed positions they are forced against the abutment members 80 to hold the unit frame 42 resiliently in operative position.

A slide 86 is mounted in track 30 and is urged by spring 88 into extended position in which it extends into track 34 to hold the tracks 30 and 34 in folded positions. A hand knob 90 is secured by a pin 92 to a headed pin 94 which is secured to slide 86. Pin 94 is slidable but captive in slot 96 in track 30.

Referring to Fig. 12 a bolt 98 is slidably mounted in unit frame 42. A spring 100 urges bolt 98 to the extended position shown in Fig. 12. In this position the bolt 98 will strike the side sill 14 and prevent movement of the unit outwardly from underneath the car when the slide 86 has been moved to release the tracks 30 and 34. A handle 102 is secured to bolt 98 and slides in slot 104 when the bolt 98 is manipulated by grasping the handle 102.

It should be explained that the bolt 98 is only an extra safety device. The unit casing 42 cannot move outwardly without engaging extension tracks 30 and 34 and forcing them into extended position. Therefore the unit cannot leave the tracks by reason of the extension arms 30 and 34 not being in extended position.

The unit casing 42 has a door 106 pivoted at 108 for access to the interior of the unit and a removable cover 110 for the same purpose.

Although specific embodiments of the invention have been described, it is contemplated that various changes may be made without departing from the scope or spirit of our invention and we desire to be limited only by the claims.

We claim:

1. Apparatus adapted to be mounted beneath a vehicle comprising a pair of horizontal, parallel fixed tracks adapted to be supported from the underside of the vehicle body, extension tracks pivotally secured about vertical axes to the outer ends of said fixed tracks, said extension tracks being pivotally movable from a first position in which they extend toward and substantially in alignment with each other to a second position in which they are substantially in alignment with said fixed tracks, a unit, rolls mounted on said unit and resting normally on said fixed tracks and being capable of being rolled onto said extension tracks to move the unit from a position under the vehicle to a temporary position out from underneath the vehicle, an abutment secured to said fixed track in the path of rolling movement of said unit, resilient means secured to said unit in the path of pivotal movement of one of said extension tracks, and means for securing said extension tracks in substantially aligned positions to compress said resilient means to resiliently hold said unit against said abutment.

2. Apparatus comprising a pair of parallel, laterally spaced horizontal fixed tracks adapted to be supported from the underside of a vehicle body, each of said fixed tracks comprising a lower rail and an upper rail, means for holding said lower rail and said upper rail in vertically spaced parallel relation, a pair of extension tracks pivotally secured about vertical axes to the outer ends of the lower rails of said fixed tracks, support members secured to the inner ends of said extension tracks and pivotally secured to the outer ends of the upper rails of said fixed tracks, a unit, rolls secured to said unit and resting normally on said fixed tracks and being capable of being rolled onto said extension tracks to move the unit from a position underneath said vehicle to a temporary position out from underneath said vehicle, an abutment secured to said fixed track, resilient means secured to said unit in the path of pivotal movement of one of said extension tracks and means to secure said extension tracks to each other to compress said resilient means to resiliently hold said unit against said abutment.

3. Apparatus adapted to be mounted beneath a vehicle comprising a pair of horizontal, parallel fixed tracks adapted to be supported from the underside of the vehicle body, extension tracks pivotally secured about vertical axes to the outer ends of said fixed tracks, said extension tracks being pivotally movable from a first position in which they extend toward and in substantial alignment with each other to a second position in which they are in substantial alignment with said fixed tracks, a pair of carriages normally supported on said fixed tracks, an abutment secured to each of said fixed tracks to engage and limit inward movement of said carriages, vibration isolators mounted on said carriages, a unit mounted on said vibration isolators, resilient means mounted on said unit in the path of pivotal movement of one of said extension tracks and means securing said one of said extension tracks against said resilient means to hold said carriages against said abutments.

4. Apparatus adapted to be mounted beneath a vehicle comprising a pair of horizontal, parallel fixed tracks adapted to be supported from the underside of the vehicle body, extension tracks pivotally secured about vertical axes to the outer ends of said fixed tracks, abutments on said extension tracks arranged to engage said fixed tracks to limit pivotal movement in one direction when said extension tracks are substantially aligned with said fixed tracks, a unit, carriages secured to said unit, rolls rotatably mounted on said carriages and resting normally upon said fixed tracks, said rolls being capable of being rolled onto said extension tracks to move the unit from a position under the vehicle to a temporary position out from underneath the vehicle.

5. Apparatus adapted to be mounted beneath a vehicle comprising a pair of horizontal, parallel fixed tracks adapted to be supported from the underside of the vehicle body, extension tracks pivotally secured about vertical axes to the outer ends of said fixed tracks, said extension tracks being pivotally movable from a first position in which they extend toward and are substantially in alignment with each other to a second position in which they are substantially in alignment with said fixed tracks, releasable means for holding said extension tracks in alignment with each other, a unit, rolls rotatably mounted on said unit and resting normally upon said fixed tracks and being capable of being rolled onto said extension tracks to move said unit from a position under the vehicle to a temporary position out from underneath the vehicle, a bolt slidably mounted on said unit, a spring for forcing said bolt outwardly from said unit to engage an abutment on said vehicle upon movement of said unit outwardly from beneath the vehicle.

References Cited in the file of this patent

UNITED STATES PATENTS

| | | |
|---|---|---|
| 2,099,747 | Melcher | Nov. 23, 1937 |
| 2,237,853 | Troche | Apr. 8, 1941 |
| 2,497,785 | Melcher | Feb. 14, 1950 |
| 2,605,689 | O'Connor | Aug. 5, 1952 |

FOREIGN PATENTS

| | | |
|---|---|---|
| 1,087,163 | France | Feb. 22, 1955 |